United States Patent

Krüger et al.

[11] Patent Number: 5,171,091
[45] Date of Patent: Dec. 15, 1992

[54] TEMPERATURE MEASURING CIRCUIT

[75] Inventors: Jürgen Krüger; Jürgen Tetard; Dieter Funken, all of Lörrach, Fed. Rep. of Germany

[73] Assignee: Endress u. Hauser GmbH u. Co., Fed. Rep. of Germany

[21] Appl. No.: 687,863
[22] PCT Filed: Oct. 5, 1990
[86] PCT No.: PCT/DE90/00762
§ 371 Date: May 29, 1991
§ 102(e) Date: May 29, 1991
[87] PCT Pub. No.: WO91/52290
PCT Pub. Date: Apr. 18, 1991

[30] Foreign Application Priority Data

Oct. 5, 1989 [DE] Fed. Rep. of Germany ....... 3933311

[51] Int. Cl.⁵ .............................. G01K 7/20
[52] U.S. Cl. ...................... 374/183; 374/166; 374/173
[58] Field of Search ................ 374/183, 166, 173

[56] References Cited

U.S. PATENT DOCUMENTS

| 4,699,519 | 10/1987 | Persson ............... 374/166 |
| 4,916,643 | 4/1990 | Ziegler et al. ....... 374/166 |

FOREIGN PATENT DOCUMENTS

| 0120102 | 10/1984 | European Pat. Off. ............ 374/183 |
| 0187317 | 7/1986 | European Pat. Off. |
| 2526027 | 12/1976 | Fed. Rep. of Germany. |
| 3200353 | 12/1982 | Fed. Rep. of Germany. |
| 0058429 | 4/1983 | Japan .................. 374/183 |
| 1352243 | 11/1987 | U.S.S.R. ............... 374/183 |

Primary Examiner—William A. Cuchlinski, Jr.
Assistant Examiner—Diego F. F. Gutierrez
Attorney, Agent, or Firm—Barnes & Thornburg

[57] ABSTRACT

The temperature measuring circuit includes a plurality of temperature sensors, each of which is formed by a temperature-dependent measuring resistance having two current terminals and two voltage tapping terminals arranged in each case between an associated current terminal and the temperature-dependent measuring resistance. The temperature sensors are connected via the current terminals in series and the series circuit is connected via two current conductors to an evaluating circuit which sends a constant current through the measuring resistances connected in series. For measuring the voltage drops caused by the constant current at the individual measuring resistances the voltage tapping terminals of each temperature sensor are connected by voltage conductors to the evaluating circuit. The two voltage tapping terminals of two temperature sensors following each other in the series circuit and assigned to two interconnected current terminals are each connected via a resistance to a common voltage conductor. This results in a considerable saving of connecting conductors compared with a temperature measuring circuit with the same number of temperature sensors each connected by two current conductors and two voltage conductors to the evaluating circuit.

3 Claims, 1 Drawing Sheet

TEMPERATURE MEASURING CIRCUIT

BACKGROUND OF THE INVENTION

The invention relates to a temperature measuring circuit comprising a plurality of temperature sensors, each of which is formed by a temperature-dependent measuring resistance having two current terminals and two voltage tapping terminals each arranged between an associated current terminal and the temperature-dependent measuring resistance, and an evaluating circuit which via the current terminals sends a constant current through each temperature sensor and measures the voltage drop caused by the constant current between two voltage conductors connected to the voltage tapping terminals.

In temperature measuring circuits of this type the temperature measurement is based on the measurement of the resistance value of the temperature-dependent measuring resistance, the resistance measurement taking place by current-voltage measurement in a four-wire circuit. The use of the four-wire technique gives a higher measuring accuracy because voltage drops caused by the current flowing through the measuring resistance at lead and contact resistances do not enter the measurement result. A disadvantage is that each temperature sensor is connected by four conductors to the evaluating circuit and consequently with a relatively large number of temperature sensors, as are often required for detecting different temperatures at different points in technical plants or processes, the number of connection conductors required rises in proportion with the number of temperature sensors and often becomes undesirably large.

The problem underlying the invention is to provide a temperature measurement circuit of the type set forth at the beginning which whilst completely retaining the advantages of the four-wire technique requires a substantially smaller number of connecting conductors between the temperature sensors and the evaluating circuit.

According to the invention this problem is solved in that the temperature sensors are connected via the current terminals in series, that the two voltage tapping terminals of two temperature sensors which follow each other in the series circuit and are associated with two current terminals connected together are connected to a common voltage conductor, and that a resistance is inserted into the connection between at least one of the two voltage tapping terminals and the common voltage conductor.

In the temperature measuring circuit according to the invention due to the series connection of the temperature sensors only two current conductors are required for the connection to the current source, irrespective of the number of said sensors, and the number of the voltage conductors required is reduced in that in each case two voltage tapping terminals belonging to two consecutive temperature sensors in the series circuit are connected to a common voltage conductor instead of to two separate voltage conductors. The total number of connecting conductors required is therefore only three greater than the number of the temperature sensors compared with four times the number of temperature sensors in conventional temperature measuring circuits. Accordingly, the saving of connecting conductors is the greater the greater the number of temperature sensors present. Due to the fact that each common voltage conductor is connected to the two associated voltage tapping terminals not directly but via resistances, it is ensured that the voltage measurement takes place practically with the same accuracy as with the conventional four-wire technique with separate voltage conductors.

Advantageous further developments and embodiments of the invention are characterized in the subsidiary claims.

BRIEF DESCRIPTION OF THE DRAWINGS

Further features and advantages of the invention will be apparent from the following description of an example of embodiment with the aid of the drawings, wherein.

DETAILED DESCRIPTION OF THE DRAWINGS

Figure 1:
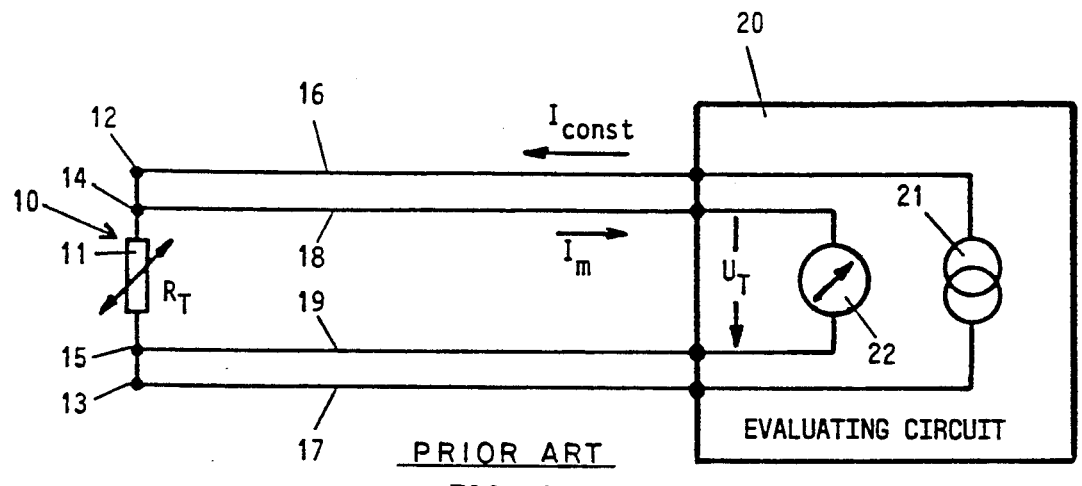
FIG. 1 shows the basic scheme of the temperature measurement with a resistance temperature sensor operated in a four-wire circuit in accordance with the prior art and FIG. 2 shows a temperature measuring circuit according to the invention having three resistance temperature sensors.

FIG. 1 shows schematically the principle of the temperature measurement by means of a resistance temperature sensor 10 operated in four-wire connection. The temperature sensor 10 includes a temperature-dependent measuring resistance 11 of resistance value $R_T$. Attached to the measuring resistance 11 are four terminals, that is two current terminals 12, 13 and two voltage tapping terminals 14, 15, the voltage tapping terminal 14 lying electrically between the current terminal 12 and the measuring resistance 11 and the voltage tapping terminal 15 lying electrically between the voltage terminal 13 and the resistance 11. Resistance temperature sensors of this type are generally known and are commercially available. In widespread use are platinum resistance temperature sensors of the type PT 100 which have a resistance of 100 Ω at 0° C.

The four terminals 12, 13, 14 and 15 are connected via four conductors 16, 17, 18 and 19 to an evaluating circuit 20. The evaluating circuit 20 includes a current source 21 which is connected via the conductors 16 and 17 to the two current terminals 12 and 13 respectively. It generates a constant current $I_{const}$ which flows via the conductor 16 through the measuring resistance 11 and via the conductor 17 back to the current source 21. The conductors 16 and 17 are therefore referred to as current conductors.

The evaluating circuit 20 further includes a voltage measuring means 22 which is connected via the conductors 18 and 19 to the two voltage tapping terminals 14 and 15. The voltage measuring means 22, symbolically represented as voltmeter, measures the voltage $U_T$ between the two conductors 18 and 19, which are referred to as voltage conductors.

In the evaluating circuit 20 the temperature-dependent resistance value $R_T$ of the measuring resistance 11 is calculated as quotient from the known current $I_{const}$ and the measured voltage $U_T$:

$$R_T = \frac{U_T}{I_{const}} \quad (1)$$

The temperature detected by the temperature sensor 10 can then be determined from the resistance $R_T$.

The resistance measurement is thus by current-voltage measurement and the use of the four-wire technique gives a higher measuring accuracy. For if the voltage between the two current conductors 16 and 17 were measured in the evaluating circuit 20, although it would then be possible to do away with the two voltage conductors 18 and 19 the measured voltage would not be exactly equal to the voltage across the measuring resistance 11 but would be greater by the voltage drops caused by the current $I_{const}$ due to the inherent lead and contact resistances of conductors 16 and 17 and terminals 12 and 13, respectively. In contrast, when applying the four-wire technique the voltage drops caused by the current $I_{const}$ at the inherent lead and contact resistances have no influence on the measurement result. The measuring current $I_m$ flowing via the voltage conductors 18, 19 is negligible when the internal resistance of the voltage measuring means 22 is large compared with the resistance $R_T$ of the measuring resistance 11, and this is always the case. Consequently, both the voltage drops caused by the measuring current $I_m$ at the lead and contact resistances and the reduction of the current flowing via the measuring resistance 11 caused by the measuring current $I_m$ can be neglected.

In technical plant and processes it is frequently necessary to detect temperatures at various locations by means of a common evaluating circuit. It is then necessary to arrange at each detection point a temperature sensor and connect the latter by the necessary conductors to the common evaluating circuit. When using resistance temperature sensors of the type outlined at the beginning operated in four-wire connection for each temperature sensor four conductors leading to the evaluating circuit are then necessary. Thus, with n temperature sensors 4n connecting conductors are necessary.

Figure 2:
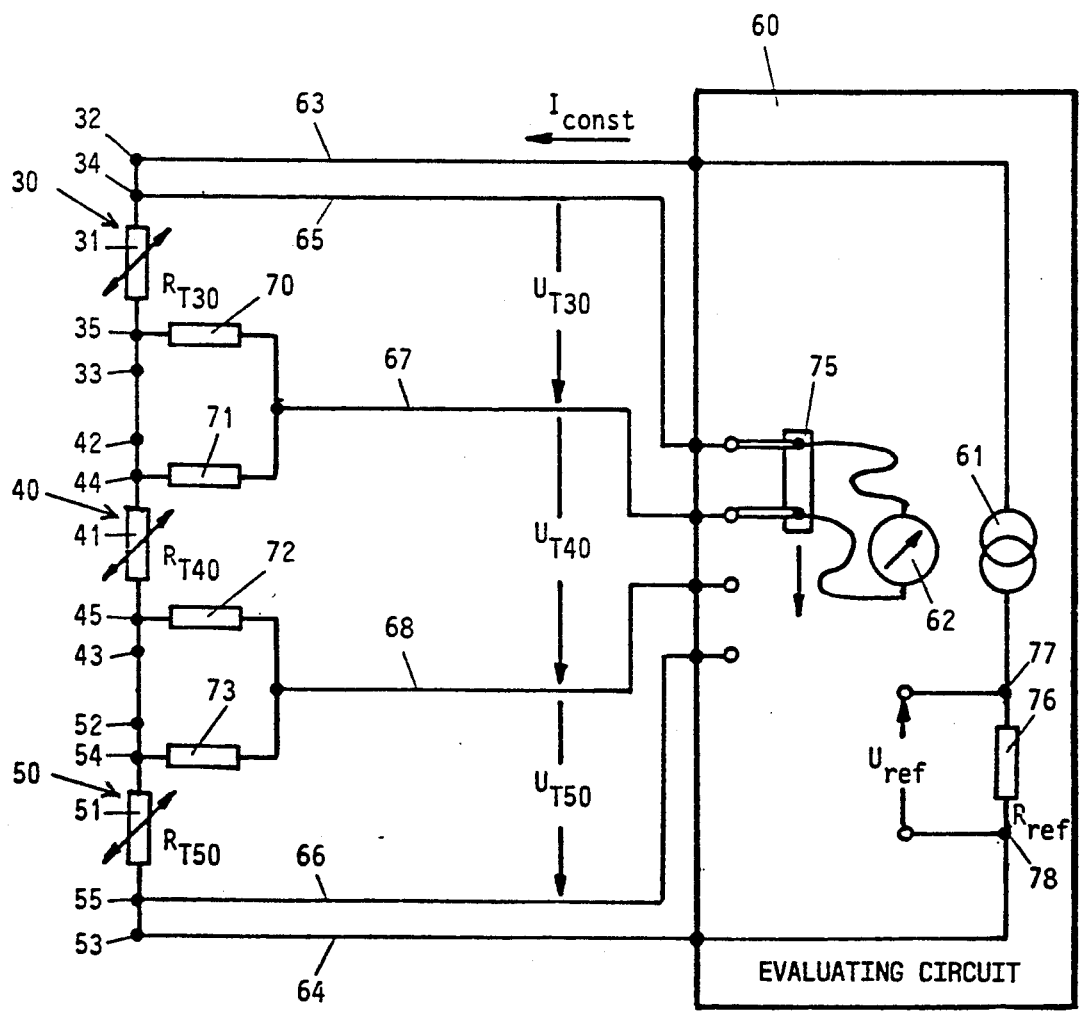

In FIG. 2 a temperature measuring circuit is shown having several resistance temperature sensors of the type outlined and a common evaluating circuit in which the number of necessary connecting conductors is substantially reduced. By way of example, three resistance temperature sensors 30, 40 and 50 are shown. The temperature sensor 30 includes a temperature-dependent measuring resistance 31 of resistance value $R_{T30}$ comprising two current terminals 32, 33 and two voltage tapping terminals 34, 35. In corresponding manner, the temperature sensor 40 includes a temperature-dependent measuring resistance 41 of resistance value $R_{T40}$ having two current terminals 42, 43 and two voltage tapping terminals 44, 45, and the temperature sensor 50 includes a temperature-dependent measuring resistance 51 of resistance value $R_{T50}$ having two current terminals 52, 53 and two voltage tapping terminals 54, 55.

The evaluating circuit 60 again includes a current source 61 furnishing a constant current $I_{const}$ and a voltage measuring means 62.

The temperature sensors 30, 40 and 50 are connected in series via their current terminals. For this purpose the current terminal 33 of the temperature sensor 30 is connected to the current terminal 42 of the temperature sensor 40 and the current terminal 43 of the temperature sensor 40 is connected to the current terminal 52 of the temperature sensor 50. The series circuit of the three temperature sensors thus formed is connected via two current conductors 63 and 64 connected to the free current terminals 32 and 53 of the temperature sensors 30 and 50 respectively, to the current source 61 in the evaluating circuit 60. The entire arrangement thus requires only two current conductors, irrespective of the number of temperature sensors, and all the measuring resistances 31, 41 and 51 are traversed by the same current $I_{const}$ in series.

The outer voltage tapping terminal 34 of the temperature sensor 30 is connected via an own voltage conductor 65 to the evaluating circuit 60 and in corresponding manner the outer voltage tapping terminal 55 of the temperature sensor 50 is connected via an own voltage conductor 66 to the evaluating circuit 60. In contrast, the two voltage tapping terminals 35 and 44 assigned to the interconnected current terminals 33 and 42 of the temperature sensors 30 and 40 are connected via a common voltage conductor 67 to the evaluating circuit 60, and in corresponding manner the two voltage terminals 45 and 52 assigned to the two interconnected current terminals of the temperature sensors 40 and 50 are connected via a common voltage conductor 68 to the evaluating circuit 60.

The two voltage tapping terminals 35 and 44 are not connected directly to the common voltage conductor 67 but each via a respective resistance 70 and 71. In corresponding manner the two voltage tapping terminals 45 and 54 are not connected directly to the common voltage conductor 68 but each via a respective resistance 72 and 73.

To enable the voltage drops across the measuring resistances 31, 41, 51 of the temperature sensors 30, 40, 50 to be measured separately the voltage measuring means 62, in the evaluating circuit 60 a switchover means 75 is contained by which the voltage measuring means 62 can be selectively connected to a respective pair of the voltage conductors 65, 66, 67, 68. For clarity the switchover means 75 is represented by mechanically movable switching contacts but in reality of course it is formed by electronic switching members, preferably in the form of a commercially available integrated circuit. Suitable for example for this purpose is the four channel analog multiplexer/demultiplexer of the type CD 4052. In the position illustrated in the drawings the switchover means 75 connects the voltage measuring means 62 to the two voltage conductors 65 and 67 so that the voltage $U_{T30}$ between said two conductors is measured. If the switching contacts of the switchover means 75 are shifted one step the voltage measuring means 62 is connected to the two voltage conductors 67 and 68 so that it measures the voltage $U_{T40}$ between said two conductors, and if the switching contacts are again shifted one step the voltage $U_{T50}$ between the two voltage conductors 68 and 66 is measured.

As a result of the resistances 70 to 73 the measured voltages $U_{T30}$, $U_{T40}$, $U_{T50}$ correspond with great accuracy to the voltage drops between the voltage tapping terminals of the temperature sensors 30, 40 and 50 respectively. If for example the resistances 70 and 71 were not provided and instead the voltage tapping terminals 35 and 44 were connected directly to the common voltage conductor 67, there would be a direct connection between the voltage tapping terminals 35 and 44 shunted to the connection between the current terminals 33 and 42. The current $I_{const}$ would then divide itself into substantially equal parts between the two parallel connections and the current proportion flowing via the shunt would cause voltage drops at contact resistances which would give a difference, not negligible, between the measured voltage and the actual voltage drop across the measuring resistance.

In contrast, in the circuit illustrated the series circuit of the resistances 70 and 71 lies in shunt with the connection between the current terminals 33 and 42. The current proportion flowing via said series circuit is thus so small that the voltage drops caused thereby at contact resistances are negligible, provided that the resistance values of the resistances 70 and 71 are large compared with the total resistance of the current path leading via the current terminals 33 and 42. On the other hand, the resistance values of the resistances 70 and 71 must be small compared with the internal resistance of the voltage measuring means 62 to ensure that the voltage drop caused by the measuring current flowing through the voltage conductor 67 at each of said resistances can be neglected compared with the measured voltage.

The above observations apply of course in the same manner to the connection between the temperature sensors 40 and 50 and to the dimensioning of the resistances 72 and 73.

The two previously specified conditions for the dimensioning of the resistances 70 to 73 can be easily fulfilled because the total resistance of the current path leading through the current terminals 33, 42 is of the order of magnitude of fractions of an ohm and the internal resistance of the voltage measuring means 62 lies in the megohm range. The measuring accuracy is thus not impaired if the resistance value of each of the resistances 70 to 73 is of the order of magnitude of 100 Ω.

It is therefore possible in the evaluating circuit 60 to determine the resistance values $R_{T30}$, $R_{T40}$ and $R_{T50}$ of the measuring resistances from the measured voltages $U_{T30}$, $U_{T40}$, $U_{T50}$ in accordance with the above equation (1) with great accuracy, provided that the current $I_{const}$ is also known with corresponding accuracy.

However, the series circuit of the temperature sensors used in the temperature measuring circuit of FIG. 2 affords the possibility of an additional step which results in the current $I_{const}$ not entering the measurement result so that the measuring accuracy is not impaired by any deviations or fluctuations of the current $I_{const}$. For this purpose a reference resistance 76 is inserted into the current loop via which the current $I_{const}$ flows and said resistance 76 is a highly constant precision resistance of value $R_{ref}$. The current $I_{const}$ flowing via the reference resistance 76 generates a voltage drop which can be tapped as reference voltage $U_{ref}$ between two voltage tapping terminals 77 and 78. The resistance values $R_{T30}$, $R_{T40}$, $R_{T50}$ of the measuring resistances 31, 41, 51 are then obtained from the ratio of the measured voltages $U_{T30}$, $U_{T40}$, $U_{T50}$ to the reference voltage $U_{ref}$ in accordance with the following equations:

$$R_{T30} = \frac{U_{T30}}{U_{ref}} \cdot R_{ref} \quad (2)$$

$$R_{T40} = \frac{U_{T40}}{U_{ref}} \cdot R_{ref} \quad (3)$$

$$R_{T50} = \frac{U_{T50}}{U_{ref}} \cdot R_{ref} \quad (4)$$

The voltage $U_{ref}$ is permanently available. If however, it is likewise called up with the aid of the switchover means 75 it must be ensured that the current $I_{const}$ does not appreciably change in the interval of time between the interrogation of one of the measuring voltages $U_{T30}$, $U_{T40}$, $U_{T50}$ and the interrogation of the reference voltage $U_{ref}$.

Preferably, the resistance value $R_{ref}$ of the reference resistance 76 is of the same order of magnitude as the resistance values of the measuring resistances so that the reference voltage $U_{ref}$ is also of the same order of magnitude as the measuring voltages. In the example described the reference resistance 76 has for example a resistance value $R_{ref}$ of 100Ω.

The principle explained with reference to the temperature measuring circuit of FIG. 2 is of course not restricted to the series circuit of three temperature sensors but can be extended to any desired number of temperature sensors. Compared with temperature measuring circuits in which each temperature sensor is connected via four own lines to the evaluating circuit, the saving of connecting conductors is the greater the greater the number of temperature sensors connected in series. With n temperature sensors, instead of 4n connecting conductors only n+3 connecting conductors are required, i.e. 3·(n−1) connecting conductors are saved. In the temperature measuring circuit illustrated in FIG. 2 having n=3 temperature sensors, instead of 4n=12 connecting conductors only n+3=6 connecting conductors are required and consequently there is a saving of six connecting conductors. With four temperature sensors the saving is nine connecting conductors, etc.

As has been explained above, the two resistances 70 and 71 via which the two voltage tapping terminals 35 and 44 are connected to the common voltage conductor 67 have the purpose of avoiding a direct shunt connection parallel to the connection via the current terminals 33 and 42. To do this it is not absolutely essential for the two resistances 70 and 71 to be present; even if one of the two resistances is omitted and replaced by a direct connection, the other resistance still lies in shunt with the connection between the current terminals. It is thus fundamentally possible to connect one of the two voltage terminals 35 or 44 directly to the common voltage conductor 67, provided that a resistance 70 or 71 is inserted into the connection between the other voltage terminal and the common voltage conductor. This applies of course in corresponding manner to the connections between the two voltage tapping terminals 45, 54 and the common voltage conductor 68, where likewise one of the two resistances 72, 73 can be replaced by a direct connection.

We claim:

1. Temperature measuring circuit comprising a plurality of temperature sensors, each of which is formed by a temperature-dependent measuring resistance having two current terminals and two voltage tapping terminals, each of said two voltage tapping terminals being arranged between an associated current terminal and the temperature-dependent measuring resistance, and an evaluating circuit which via the current terminals sends a constant current through each temperature sensor and measures the voltage drop caused by the constant current between two voltage conductors connected to the voltage tapping terminals, characterized in that the temperature sensors are connected in series via the current terminals, that the two voltage tapping terminals of two temperature sensors which follow each other in the series circuit and are associated with two current terminals connected together are connected to a common voltage conductor, and that a resistance is inserted into the connection between at least one of the two voltage tapping terminals and the common voltage conductor.

2. Temperature measuring circuit according to claim 1, characterized in that a constant reference resistance of known magnitude is connected in series with the temperature sensors in such a manner that it is traversed by the constant current and that the voltage drop caused by the constant current across the reference resistance is used in the evaluating circuit as reference voltage for determining the resistance value of each measuring resistance.

3. Temperature measuring circuit according to claim 1, characterized in that the evaluating circuit includes a voltage measuring means and a switchover means for connecting the voltage measuring means in each case to two voltage connectors connected to the same temperature sensor.

* * * * *